US009792330B1

(12) United States Patent
Hawkins et al.

(10) Patent No.: US 9,792,330 B1
(45) Date of Patent: Oct. 17, 2017

(54) IDENTIFYING LOCAL EXPERTS FOR LOCAL SEARCH

(71) Applicant: GOOGLE Inc., Mountain View, CA (US)

(72) Inventors: John Alastair Hawkins, London (GB); Cristina Stancu-Mara, London (GB)

(73) Assignee: GOOGLE INC., Mountain View, CA (US)

( * ) Notice: Subject to any disclaimer, the term of this patent is extended or adjusted under 35 U.S.C. 154(b) by 979 days.

(21) Appl. No.: 13/873,378

(22) Filed: Apr. 30, 2013

(51) Int. Cl.
G06F 17/30 (2006.01)

(52) U.S. Cl.
CPC .... *G06F 17/3053* (2013.01); *G06F 17/30525* (2013.01); *G06F 17/30699* (2013.01)

(58) Field of Classification Search
CPC ........... G06F 17/30867; G06F 17/3053; G06F 17/30241; G06F 17/30424; G06F 17/30029; G06F 17/3089
USPC ............................ 707/705–780; 705/1.1–500
See application file for complete search history.

(56) References Cited

U.S. PATENT DOCUMENTS

| | | | |
|---|---|---|---|
| 2002/0046203 A1* | 4/2002 | Siegel | G06F 17/30867 |
| 2002/0052913 A1 | 5/2002 | Yamada et al. | |
| 2005/0160080 A1 | 7/2005 | Dawson | |
| 2005/0204005 A1* | 9/2005 | Purcell | G06Q 10/107 709/206 |
| 2006/0004713 A1* | 1/2006 | Korte | G06F 17/30867 |
| 2006/0069701 A1 | 3/2006 | O'Rourke, III | |
| 2006/0282336 A1* | 12/2006 | Huang | G06F 17/30864 705/26.61 |
| 2007/0288314 A1 | 12/2007 | Cao et al. | |
| 2009/0024605 A1* | 1/2009 | Yang | G06F 17/30873 |
| 2009/0100049 A1 | 4/2009 | Cao | |
| 2009/0287682 A1 | 11/2009 | Fujioka et al. | |
| 2010/0036806 A1* | 2/2010 | Lam | G06F 17/3087 707/706 |
| 2010/0042577 A1* | 2/2010 | Rinearson | G06Q 10/10 706/56 |
| 2010/0262610 A1* | 10/2010 | Acosta | G06Q 10/00 707/748 |
| 2010/0332511 A1 | 12/2010 | Stockton et al. | |
| 2012/0095978 A1* | 4/2012 | Levin | G06Q 30/02 707/706 |
| 2012/0158611 A1* | 6/2012 | Pulito | G06Q 10/10 705/347 |
| 2015/0017616 A1* | 1/2015 | Rachitsky | H04W 4/206 434/130 |

* cited by examiner

*Primary Examiner* — Michelle Owyang
(74) *Attorney, Agent, or Firm* — Marshall, Gerstein & Borun LLP

(57) ABSTRACT

Provided is a process, including: obtaining reviews of a reviewed category of businesses in a reviewed geographic area by reviewers; determining that reviews from more than a threshold number of reviewers have been obtained and, in response, identifying at least some of the reviewers as being experts in the reviewed category of businesses in the reviewed geographic area; receiving a query from a user; identifying a geographic area and a category of businesses for the query; ranking, with a processor, local search results responsive to the query based on the reviews of the experts in the reviewed geographic area and reviewed business category; and sending ranked search results to the user.

19 Claims, 5 Drawing Sheets

IDENTIFYING LOCAL EXPERTS FOR LOCAL SEARCH

BACKGROUND

1. Field

Embodiments relate generally to web services and, more specifically, to systems for identifying experts whose reviews are used to rank local search results or reviews of search results.

2. Description of the Related Art

Local search engines are generally used to obtain information about businesses and other points of interest related to some geographic area. For example, a user may submit a query for "Italian restaurants in New York," and in response, a local search engine typically attempts to identify responsive content, such as websites of Italian restaurants in New York and reviews of such restaurants. Generally, however, local search queries implicate substantially more web resources than a user is interested in viewing (e.g., there may be several hundred websites of, or about, New York Italian restaurants), and identifying the subset of responsive web resources likely to warrant the user's attention can be difficult.

Often, some users are particularly knowledgeable about certain topics relating to local search queries, for instance some users are experts in a particular genre of restaurants, a particular city or neighborhood, a type of retailer, or a combination of these categories (e.g., the New York Italian restaurants responsive to the above-mentioned query). Such experts, however, can be difficult to identify, particularly at web scale, as many users with relatively little expertise will hold forth on various topics; some users will self identify as experts in order to propagate spam for commercial benefit; and the number of local-search topics on which one may be an expert is very large.

SUMMARY

The following is a non-exhaustive listing of some aspects of the present techniques. These and other aspects are described in the following disclosure.

Some aspects include a process, including: obtaining reviews of a reviewed category of businesses in a reviewed geographic area by reviewers; determining that reviews from more than a threshold number of reviewers have been obtained and, in response, identifying at least some of the reviewers as being experts in the reviewed category of businesses in the reviewed geographic area; receiving a query from a user; identifying a geographic area and a category of businesses for the query; ranking, with a processor, local search results responsive to the query based on the reviews of the experts in the reviewed geographic area and reviewed business category; and sending ranked search results to the user.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
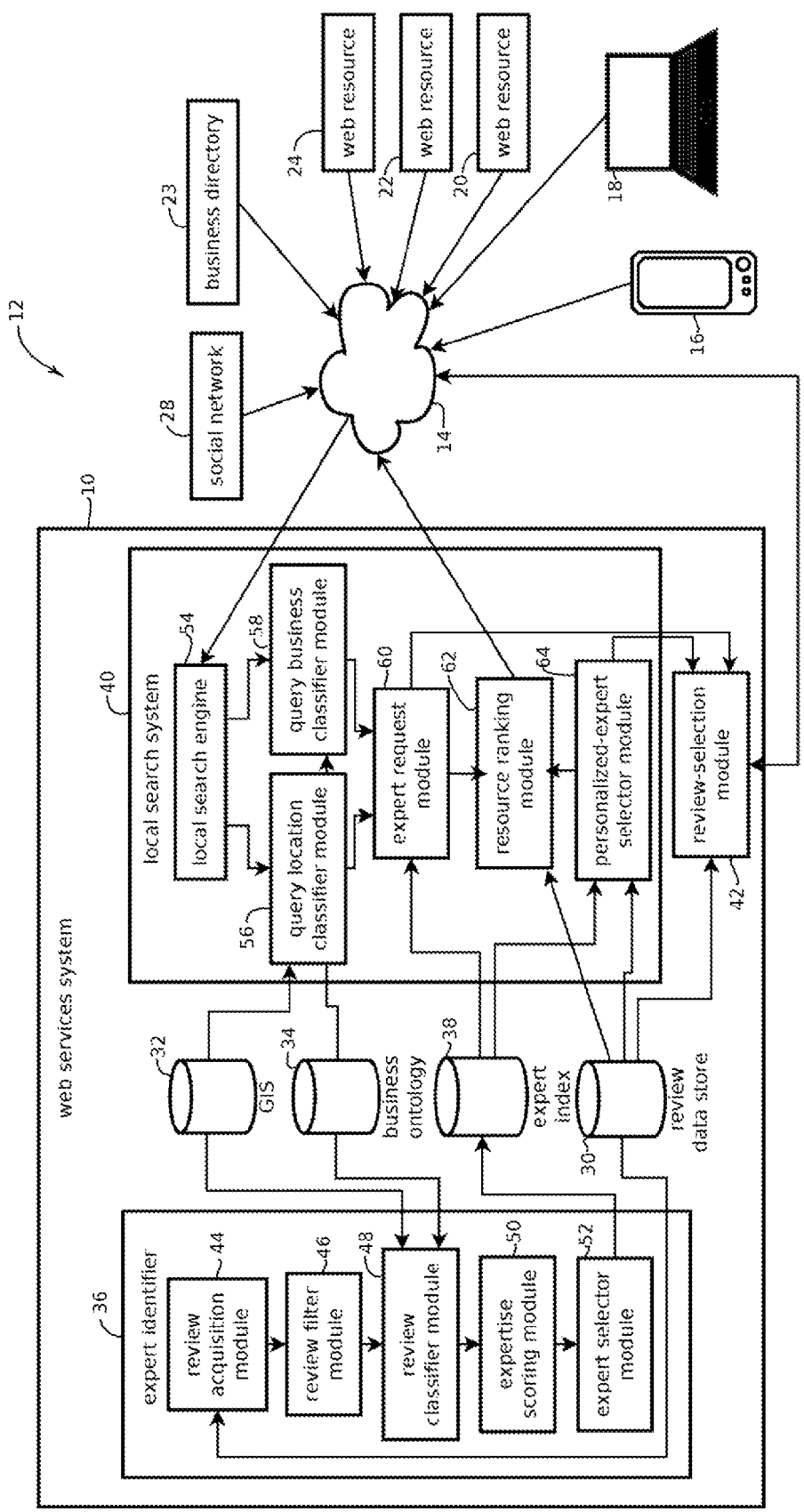
FIG. 1 shows an embodiment of a web services system operative to identify experts on geographic areas and types of businesses and ranked local search results and reviews based on the identified experts.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

Local search benefits from using web-hosted consumer reviews to rank businesses (e.g., business websites, websites about businesses, or other local business-related content), but many reviews are not trustworthy, either because the reviewer lacks expertise, or the reviewer has different preferences from the user submitting a local search query. This problem and others are mitigated by some embodiments of a web services system 10 (shown in FIG. 1) that pre-processes reviews to identify experts and, then, uses the experts' reviews to rank local search results.

In operation, reviews are submitted by users to various websites, and based on at least some of those reviews, experts are identified and businesses are ranked. Submitted reviews are first filtered to remove spam. The remaining reviews are then categorized according to the geographical area and category of business to which the reviews relate, in some cases in hierarchical categories with varying levels of geographic and business-type specificity. For each area-category pair (e.g., California bike shops), experts are identified as those users who have provided the most non-spam reviews of businesses in the area-category pair. Later, the identified experts are referenced when a local search query relates to the corresponding geographical area and category of business, and reviews by the previously identified experts are used to rank local search results based on reviews of the responsive businesses by the experts. Further, some embodiments personalize the selection of experts by identifying those experts whose reviews are similar to those of the user from whom the local search query was received. And, some embodiments calculate an expertise score for each expert, a value which is used to rank reviews about a given business for presentation to a user after a user selects a corresponding local search result.

For example, several thousand users may submit to a social networking service or a business directory reviews of various businesses in New York State. Embodiments obtain these reviews from the social networking service, business directory, or both, and filter out those reviews that are likely spam and those reviews that are less than a few words in length to identify a set of substantive user reviews. The remaining reviews are grouped by geographic area and category of the business, forming for instance, a subset of reviews relating to Italian restaurants in New York City. A few users typically submit substantially more reviews in the subset than other users, for instance one user may have submitted 35 different reviews about 35 different Italian restaurants in New York City, while most users may have submitted a single review. Those users with reviews in the area-category subset are ranked according to the number of reviews they have submitted in the subset, and a number (e.g., the top 10) are designated as experts on, for instance, Italian restaurants in New York City. Later, when a user submits a local search query requesting, for example, Italian restaurants near New York City, the same area-category is detected in the query; the corresponding top experts are retrieved from memory; and reviews by those experts are used to rank local search results identifying New York City Italian restaurants, thereby potentially presenting to the user some of the best Italian restaurants in New York City according to local experts.

Thus, some embodiments operate on reviews provided by users. In situations in which the systems discussed here collect personal information about users, or may make use of personal information, the users may be provided with an opportunity to control whether programs or features collect user information (e.g., information about a user's social network, social actions or activities, profession, preferences, or current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web services system 10.

The web services system 10 of FIG. 1 operates in a computing environment 12 from which reviews and local search queries are received and to which local search results and ranked reviews are provided. In this embodiment, the computing environment 12 includes the Internet 14, user devices 16 and 18, web resources 20, 22, and 24; a business directory 23; and a social network 28. The Internet 14 may be connected to the various components of computing environment 12 either directly or via various other networks, such as a local area network, a wireless area network, a cellular network, or the like. The user devices 16 or 18 may be smart phones, tablets, laptops, desktop computers, or the like, examples of which are described below with reference to FIG. 5, and the user devices 16 or 18 may interact with the web services system 10 either with a web browser executing on the corresponding user device or a special-purpose application, such as a smart phone app.

Web resources 20, 22, and 24 are each, in this embodiment, web servers hosted by different entities, having websites corresponding to different local search results, such as websites of (or about) local businesses. Local search results generally relate to geographic places, such as businesses, landmarks, and other points of interest, and the relevance of local search results depends, in part, on geographic distance, such as a distance from a location of the user who submitted a query (e.g., as determined by geocoding the user's IP address, based on a user profile, by a location sensor of the user device, or a map extent displayed in an interactive map in which the query was entered), or a geographic distance from a location specified in a query (e.g., a search for a "furniture store near Dallas, Tex."). In some cases, a search result is local if it falls within a threshold distance to the query location, e.g., within 50 miles or one-hour's driving distance, or distance may be used to weight search results, such that closer businesses tend to rank above further businesses.

The business directory 23, in some embodiments, is hosted on a website having a webpage for each of a plurality of businesses, the webpage including contact information for the businesses, information about the businesses (e.g. operating hours, menus, photos of the business, and the like), and user reviews of the businesses. In operation, users of user devices 16 or 18 log into or otherwise access the business directory 23, and request a webpage corresponding to a given business, such as a restaurant the user visited the previous day. Using an interface in the responsive webpage, the user can provide a review of the business to be displayed by the business directory 23 to others. In some cases, the review includes a prose portion in which the user enters a text review, for instance describing a bad experience with a given waiter or a particular dish they enjoyed, and/or a score (e.g. a rating, such as binary score of thumbs-up or thumbs down, or a discrete score of 0 to 5 stars, or the like). The review is stored in memory of the business directory 23 in a record associated with the user and the business that was reviewed. Similarly, the social network 28 hosts a website by which users log into their user account, identify their relationships with other users, other interests, and various businesses, and, provide reviews of various businesses using a process like the one described above for the business directory 23.

Data from the business directory 23 and the social network 28 is imported to the web services system 10, which includes a review data store 30, a geographic information system 32, a business ontology 34, an expert identifier 36, an expert index 38, a local search system 40, and a review-selection module 42. These components communicate with one another to identify experts, respond to local search queries, and provide reviews addressing local search results. In different embodiments, the web services system 10, the social network 28 and the business director 23 may be hosted by the same entity or on the same server or collection of servers, or may be hosted by different entities or on different servers or collections of servers.

In some embodiments, the review data store 30 periodically downloads reviews from the business directory 23 and/or the social network 28. The obtained reviews, in some cases, are stored in user records, each record corresponding to a user account on the social network 28, the business directory 23, or both, and including an identifier, such as a distinct username of the user account. Each user record includes one or more reviews by that user. The reviews each include an identifier of the business, such as a distinct business-identify in the business directory 23 for a given business, a timestamp of when the review was submitted, review text containing a prose review provided by the user, and may include a review rating entered by the user, such as at thumbs-up or thumbs down or a numerical score for the business reviewed (e.g., a score ranging from 0 to 30 on each of several aspects of the business such as ambience, food quality, service, etc.).

In some embodiments, the geographic information system 32 stores and responds to queries about geographically distributed entities, such as businesses, streets, municipalities, countries, rivers, lakes, and the like. In some cases, hierarchical relationships between the entities are identified in the geographic information system 32. Further, the geographic location, and in some cases boundaries, of the entities are also described in the geographic information system 32, along with one or more names by which the geographic entities are known to users. In some cases, the geographic information system 32 is operative to respond to a query for entities within a geographic area or a query for geographic locations of entities having a given name. The depicted geographic information system 32 includes the location and names of businesses that users have reviewed and the hierarchy of geographic areas containing those businesses, such as the neighborhood, city, state, and country. Each entity in the geographic information system 32, including these businesses, has a unique entity identifier, such as an arbitrarily-selected, distinct entity number, which may be used as a key to link records in the various portions of the computing environment 10 associated with the entity.

Embodiments of the business ontology 34 include records describing the various types of businesses (e.g., business categories) and indicating the hierarchical relationship of varying levels of specificity between the types, such as records indicating that restaurants are a type of business, Italian restaurants are a type of restaurant, and pizza places are a type of Italian restaurant. Each of these type records is associated with the entity identifiers (e.g., in the GIS 32 or the business ontology 34) of businesses of that type. For instance, an entity identifier of a given transmission shop in Los Angeles may be associated with a type record for automotive repair and a type record for automotive transmission repair. Thus, some embodiments of the business ontology 34, together with the geographic information system 32, indicate for a given business where it is located and what kind of business is conducted and, inversely for a given geographic area and category of business, which specific businesses satisfy such criteria. These relationships are used to identify various types of businesses in geographic areas of varying levels of specificity to define topics on which experts are identified. And in some embodiments, these relationships are used to categorize queries according to geographic area and type of business such that the corresponding experts can be retrieved from memory.

The expert identifier 36 identifies experts based on reviews in the review data store 30 on categories of business in the business ontology 34 in geographic areas identified by the geographic information system 32, i.e., on topics defined by area/type pairs (or just areas or just topics, in certain applications). In some embodiments, the expert identifier 36 includes a review acquisition module 44, a review filter module 46 a review classifier module 48, an expertise scoring module 50, and an expert selector module 52. These components 44, 46, 48, 50, and 52 cooperate and communicate with one another to identify experts for particular types of businesses and/or for particular geographic areas. In some cases, the experts are identified in advance of situations in which the expert identification is used, for example by performing batch processes that preprocess the stored reviews, e.g., on a daily or weekly basis. Preprocessing the reviews to identify experts facilitates relatively prompt identification of experts when responding to subsequent queries, but some embodiments may identify experts based on reviews at query time, allowing the expert designations to be more current.

The preprocessing is initiated by the illustrated review acquisition module 44, which retrieves reviews from the review data store 30. In some cases, the review acquisition module 44 requests or selects reviews of less than a threshold age, for example two years, to base the identification of experts on relatively up-to-date data. The reviews are returned from the review data store 30 in the form of the above-described user records, such that the reviews are associated with a corresponding user by which experts are identified.

In some embodiments, each of the acquired reviews is processed by the review filter module 46 to discard reviews of less than a threshold length and to discard reviews likely to be spam. Reviews are identified as spam by submitting the text of the review to a spam detector, which indicates which reviews are spam based on previous correlations between keywords, users, businesses, and the occurrence of spam. Additionally, spam is detected based on the user identifier and identifier of the business being reviewed. In some cases, a quality score is calculated for each review based on various signals, such as the presence of keywords or n-grams known to correlate with low-quality reviews or sentence structure indicative of low-quality review (e.g., mal-formed sentences lacking a subject and a predicate). Or in some cases, user reviews are manually flagged by a human operator as being spam. User reviews of less than a threshold length are discarded, as experts tend to write longer, more informative reviews.

The remaining reviews, i.e., those not removed by the review filter module 46, are advanced to the review classifier module 48, which identifies a geographic area corresponding to each review and a type of business corresponding to each review. For example, each review is associated with a geographic area by submitting the distinct business identifier of the review to the geographic information system 32 (or, where a business identifier is unavailable, by submitting a business name mentioned in the review). In some cases, a hierarchy of geographic areas is associated with each review, for example, identifying the neighborhood, city, state, and country of the review. Similarly, the type of business is identified based on records in the business ontology 34 by submitting to the business ontology 34 the business identifier (or if unavailable, a business name mentioned in the review). Again, a hierarchy of types of businesses is also associated with the review. Thus, a given user record may include six reviews by that user, four of which passed the review filter module or 46, and a given one of those selected reviews may be on a particular Italian restaurant in New York City, causing that review to be associated with the Upper East Side neighborhood, New York City, N.Y. State, the United States of America, restaurants, Italian restaurants, pizza places, and each combination of these area and type designations.

The classified reviews are advanced to the expertise scoring module 50 which calculates expertise scores on various combinations of geographic area and type of business for each of the users who have provided reviews. In some cases, an expertise score is calculated for each user, for each geographic area and for each type of business in which one of their reviews was classified, and for each combination of geographic area and type of business. For example, a single review of a clothing boutique in Chicago may be factored into an expertise score for that reviewer on each of the following: clothing boutiques, Chicago clothing boutiques, Illinois clothing boutiques, retail stores, Chicago retail stores, Illinois retail stores, Chicago, and Illinois. Each expertise score for a given user is based on the number of reviews provided by that user in the category of business and geographic area corresponding to the expertise score. Thus, one review often counts towards several different expertise scores for geographic areas and business types. Thus, five reviews of sporting-goods stores in Miami and five reviews of pet-supply stores in Tampa count as ten reviews on Florida retail businesses. Or reviews on twenty specialty chocolate stores in a dozen different US states counts towards twenty reviews for an expertise score on chocolate stores in the United States. In some cases, each of the reviews is weighted based on the time since the review occurred, the length of the review, or indications from other users regarding the quality of the review, such as up vote or down votes indicating that the review was helpful. Thus, each user is associated with a plurality of expertise scores, each expertise score corresponding to a different combination of geographic area and business type, and each expertise score being the number of reviews by that user (or weighted sum) corresponding to the respective combination of geographic area and business type.

The user records and associated expertise scores for each user are advanced to the expert selector module 52 which, in some embodiments, select experts on various combinations of business type and geographic area based on the expertise scores of the users. For example, for each combination of business type and geographic area specified by the geographic information system 32 and business ontology 34, users having reviews in that geographic area and for that business type are ranked according to their expertise score. Those users ranking above a threshold (e.g., the top ten) are designated as experts by the expert selector module 52. In some embodiments, designating experts for a given combination of geographic area and business type includes storing an expertise record in the expert index 38. To facilitate prompt recall, the expertise records may be sorted key-value pairs in which the key is a combination of the geographic area and the business type and the value is a list of the experts having greater than a threshold rank, such as a list of user identifiers by which current and subsequent reviews by the experts are retrieved. Indexing the experts according to geographic area and business type pairs is expected to facilitate relatively fast retrieval of experts when a query is categorized as relating to the geographic area and business type.

In some cases, some combinations of business type and geographic area are not reviewed, as some business types are not present in some geographic areas or generate relatively little interest. Accordingly, some embodiments determine whether more than a threshold number of users (e.g., three) have provided a review in the corresponding business type and the geographic area pair before identifying experts on that combination. Thus, users with relatively little expertise who happened to have reviewed obscure combinations of business type and geographic areas are not designated as experts.

As noted above, the expert index 38 has a list of experts for topics defined by pairs of geographic area and business type. In some embodiments, the index is organized to facilitate relatively fast retrieval, for instance, in a hash table having hash values calculated based on the area/topic-pair keys, or in a sorted list to facilitate a binary search. Entries may include pointers to less specific entries, either by area or business type. In some embodiments, the entries are organized in a trie according to hierarchical relationships between geographic areas or business type to facilitate relatively fast identification of less specific geographic areas or business types when a given area/type-pair does not have experts. The expert index 38 is operative to respond to a query for experts in a given geographic area and business type by returning the corresponding list of experts or, if a given area/type-pair is associated with a null value, adjusting the specificity of the request toward less specific designations of area or business types until experts are identified. For instance, a request for experts in Senegalese restaurants in Marfa, Tex. may be received by the expert index 38, and the expert index 38 may determine that no such experts exist, for example, because less than a sufficient number of reviews were received to identify experts for that combination of geographic area and business type. In response, the expert index 38 decreases the specificity of the request and returns, for example, experts in restaurants in general in Marfa, Tex., or experts on Senegalese restaurants in the state of Texas. In some cases, the specificity is progressively decreased, by geographic area, business type, or both (for example, by alternating between the two), until experts are identified.

In some applications, the local search system 40 uses the pre-identified experts to rank local search results. The illustrated local search system includes a local search engine 54, a query location classifier module 56, a query business classifier module 58, an expert request module 60, a resource ranking module 62, and a personalized-expert selector module 64.

In some embodiments, the local search engine 54 is a conventional local search engine. The local search engine 54 may include a web server operative to present a search interface, for example, in an interactive map or a web search page; receive a query entered by a user; and identify and rank local search results responsive to the query. In some cases, the query is expressed in text and includes a geographic location, e.g., explicitly identified in the text of the query (e.g., "Italian restaurants near New York") with a modifier such as "near." Or the location may be based on a location returned by the user device submitting the query (for instance, based on a geocoded Internet Protocol address, a location detected by the user device with a satellite-based system such as the global positioning system, or a location associated with the user account of the user). The location may also be based on previous user interactions, e.g., based on an extent of a map presented in an interactive map when the query was submitted. The local search results are URLs of the web resources 20, 22, and 24, which the local search engine 54 ranks based on distance between a geographic location associated with the local search results and the location associated with the query. Web resources 20, 22, and 24 are geocoded based on their content, e.g., based on street addresses mentioned in their text, or based on a location documented in the GIS 32 of a business described by the respective web resource. The local search results may be assigned a preliminary rank or score based on relevance and distance. The local search results from the local search engine 54, along with the query itself and associated data, are advanced for expert identification and re-ranking (or an initial ranking) based on expert reviews.

The query from the user is classified by the query location classifier module 56. Classifying the query by location may include submitting various portions of the query to the geographic information system 32 to determine whether they correspond to a geographic location, parsing out stop-words, and identifying words denoting location, such as "near." Similarly, the query business classifier module 58 classifies the business type to which the query applies or to which the local search results that are responsive to the query apply. Classifying the business type may include parsing stop-words, identifying which portions of the query relates to location, and submitting the remaining portions to the business ontology 34 to identify whether the remaining portions correspond to a business name or type of business name. In some embodiments, the query is submitted to the location classifier module 56 and the business classifier module 58 prior to obtaining the local search results. In other embodiments, the query is submitted to the location classifier module 56 to identify a query location (if any), local search results are obtained, and the local search results are sent to the business classifier to determine the business categories (if any) respectively associated with the local search results. For each business type and geographic location respectively identified by the business classifier 58 and query location classifier 56, the identifier of the business type and the identifier of the geographic location are advanced to the expert request module 60, which submits a request to the expert index 38 for the experts corresponding to the pair of geographic location and business type. The expert index 38, in this embodiment, returns a list of experts on the area/business-type pair, reducing the specificity of the request as needed until experts are identified.

The identified experts, along with the preliminary ranked or scored local search results, are advanced to the resource ranking module 62. The resource ranking module 62 adjusts the ranking or scoring of the local search results based on reviews of the identified experts. In some embodiments, reviews by the experts are retrieved from the review data store 30, and an expert review score is calculated for each search result reviewed by one of the experts. In some cases, the expert review score is an average numerical rating provided by the expert during the review (e.g., 0 to 5 stars). In other cases, the text of expert reviews is reviewed and associated with a score by a human reviewer or with natural language processing, e.g., based on use of terms like "awful" or "terrific" indicating reviewer sentiment, and the scores are averaged to calculate the expert review score. In some cases, the expert review score is a weighted combination (e.g. a weighted average) of the reviews by the experts based on the expertise score of those experts, such that the highest-rated expert has a greater influence on the expert review score than lower rated experts. The local search results are then ranked, or re-ranked, according to the expert review score, such that local businesses highly regarded by experts tend to rank higher than they otherwise would absent the present techniques. For example, a bicycle shop that is very highly regarded by experts may rank higher than a slightly closer and otherwise more relevant bicycle shop in a given query asking for bicycle shops near some location. The ranked local search results are sent by the local search system 40 to the user device 16 or 18 from which the query was received along with instructions to present the local search results, e.g., in a browser or special-purpose application, on a display of the user device 16 or 18 in ranked order.

In some embodiments, expert selection is personalized based on agreement between reviews of the user who submitted the query and reviews of the candidate experts. Such embodiments include the personalized-expert selector module 64. These embodiments receive the geographic location and business type identified by the query location classifier module 56 and the business classifier module 58 and, in response, request experts from the expert index 38, as described above. Then, reviews by the experts are retrieved from the review data store 30, along with reviews by the user who submitted the local search query. The expertise score of each of the experts is then weighted according to a personalization score. In some embodiments, each personalization score is calculated based on the number of businesses reviewed both by the user and the respective candidate expert and an agreement score determined by the degree to which the user and the candidate expert agree on reviews (e.g., rating scores) of a given business. In some cases, the agreement score is calculated by determining an average difference between ratings of businesses by the user and the respective candidate expert. The expert scores are adjusted based on the personalization scores, and those experts having a personalized expert score above a threshold are deemed personalized experts. The personalized-expertise score for personalized experts can be used to weight the reviews by those experts when ranking local search results. Identifying personalized experts is expected to account for the tendency of users to have differing tastes and for some users to be particularly prolific in reviewing businesses for those with similar taste.

In some cases, search results are presented in a user interface by which the user can request reviews of the business corresponding to the local search results, for example by mousing over or touching a search result or clicking on the search result. In such embodiments, the request for reviews about the specific business are sent to the review-selection module 42, along with a session identifier by which the set of experts can be identified, or a designation of the area/type pair by which the experts can be identified. Reviews from the experts are retrieved from the review data store and ranked according to expertise score or personalized expertise score of the experts. The responsive reviews are then sent to the user device for presentation in ranked order. Again, ranking those reviews from the experts that are particularly prolific about a given business and geographic area is expected to highlight relatively high-quality, high-relevance reviews for users, which is expected to facilitate efforts by users to find highly regarded businesses.

The web services system 10 is described above with reference to discrete functional blocks, but it should be noted that hardware or software by which such functionality is implemented may be intermingled, conjoined, subdivided, parallelized, serialize, co-located, distributed, or otherwise differently arranged from the manner in which the functional blocks are illustrated. Further, code by which such functionality is implemented may be stored on a tangible, non-transitory, machine-readable medium such that when the code is executed by a data processing apparatus, examples of which are described below with reference to FIG. 5, the data processing apparatus effectuates the operations described herein.

Figure 2:
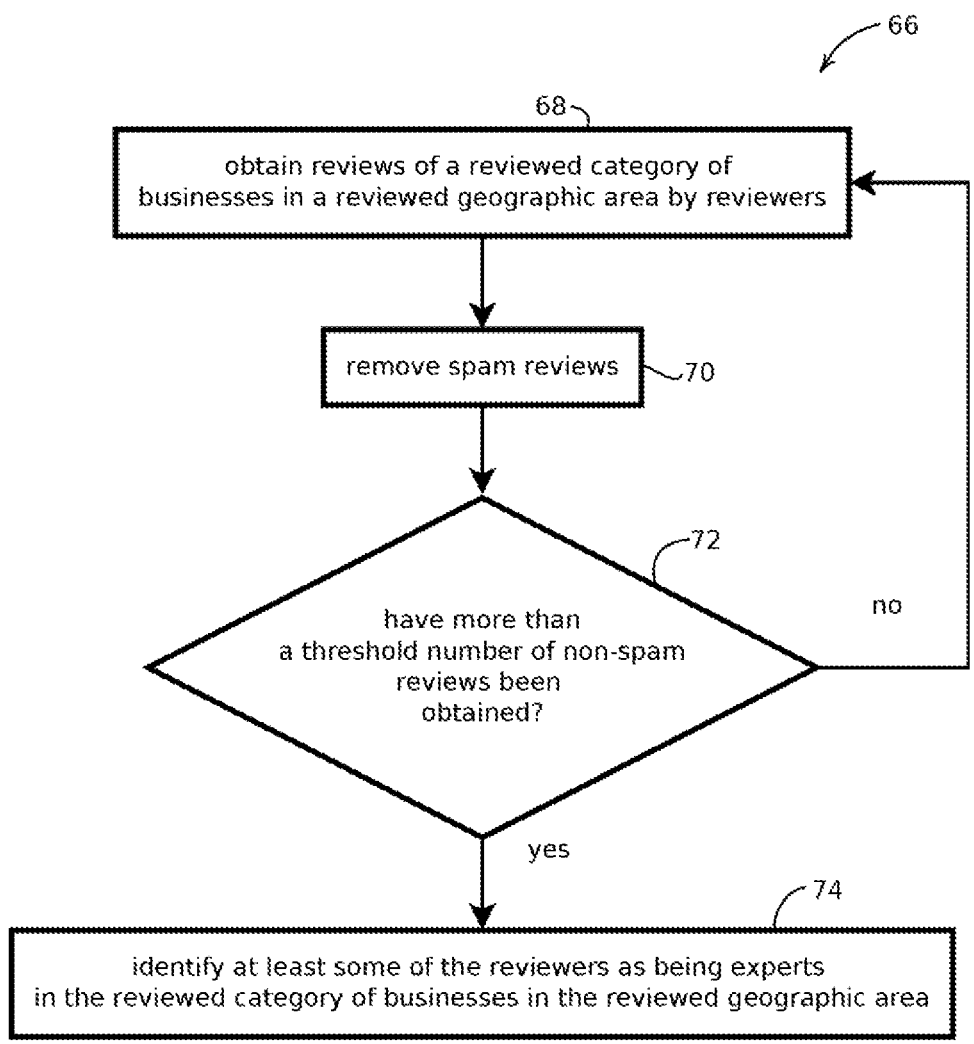
FIG. 2 shows an embodiment of a process for identifying experts.

FIG. 2 illustrates an embodiment of a process 66 for identifying experts in geographic areas and types of businesses. The process 66 is performed by the above-described expert identifier 36 but is not limited to the features of that implementation. The illustrated process 66 begins with obtaining reviews in a category of businesses in a geographic area, as indicated by block 68. Next in this embodiment, spam reviews and reviews that are less than a threshold length are removed, as indicated by block 70. Embodiments then determine whether the geographic area and category of business correspond to more than a threshold number of non-spam reviews, as indicated by block 72. Upon determining that less than the threshold number of reviews have been obtained, the process returns to step 68 to obtain additional reviews, waiting, for example, over weeks or months. Upon determining that the threshold number of reviews has been attained, the process proceeds to step 74, and at least some of the reviewers are identified as being experts in the reviewed category of business in the reviewed geographic area, as indicated by block 74. Identifying the experts may include creating one of the above-described expert review records in the expert index 38.

Figure 3:
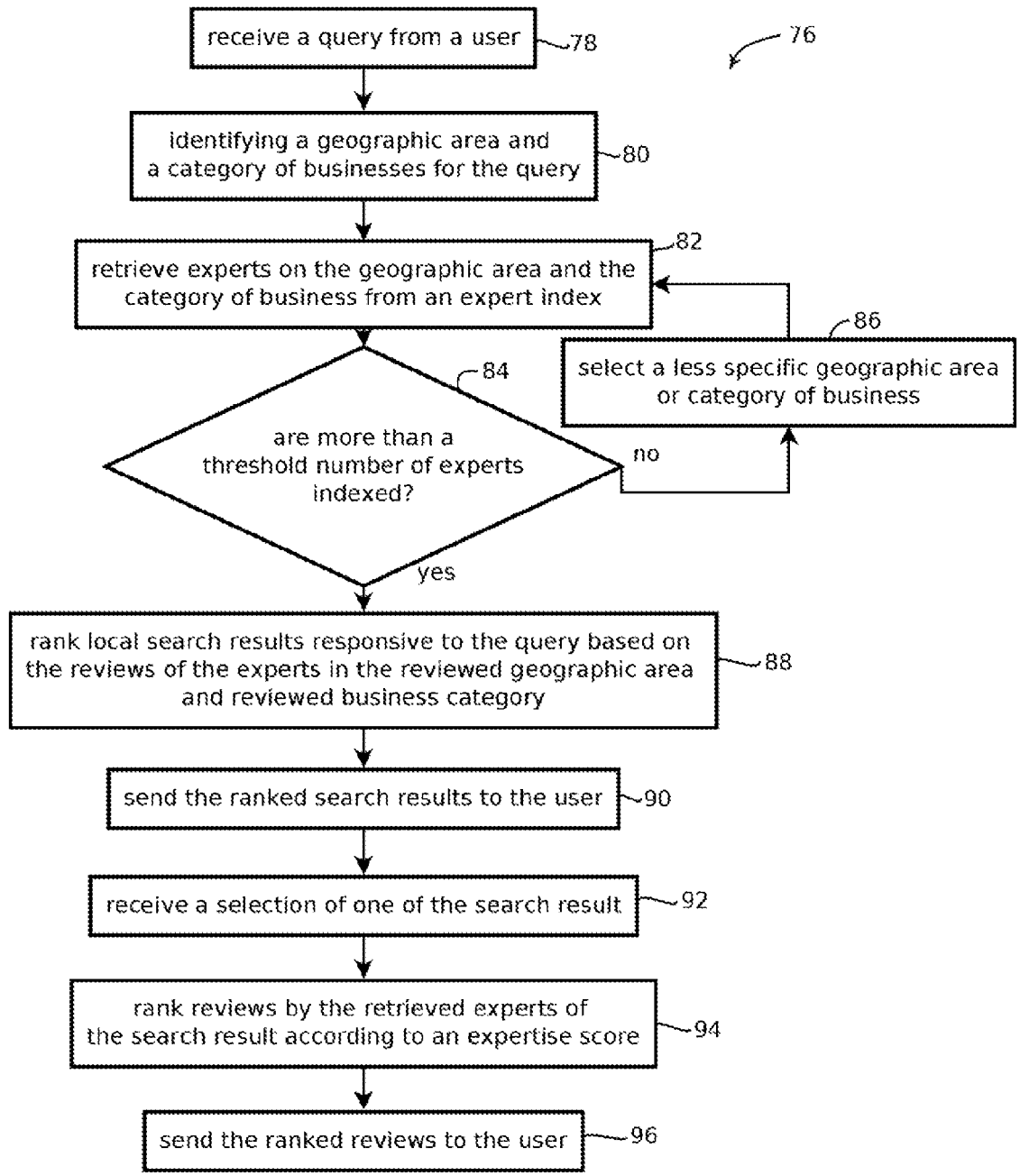
FIG. 3 shows an embodiment of a process for ranking local search results based on ratings by experts.

FIG. 3 illustrates an embodiment of a process 76 for ranking local search results based on expert reviews. The process 76 includes receiving a query from a user, as indicated by block 78. The query may be received by the above mentioned local search engine 54 of FIG. 1. Next, the process 76 includes identifying a geographic area and a category of business of the query, as indicated by block 80. This step may be performed by the above-described classifier modules 56 and 58. In some embodiments, the geographic area is determined for the search query, responsive search results are obtained, and the category or categories of business are determined for each of the search results. The process 76 of this embodiment further includes retrieving experts on the geographic area and the category of business from an expert index, as indicated by block 82, which may be performed by the expert request module 60. Next, the process 76 determines whether there are more than a threshold number of experts indexed for the geographic area and category of business, as indicated by block 84. Upon determining that there are fewer than the threshold number of experts, the process proceeds to block 86 and a less specific geographic area or category of business is selected, and additional experts are received based on these less specific criteria in block 82. Upon determining that the threshold number of experts is met or exceeded, the process proceeds to block 88, and local search results are ranked based on the reviews of the experts in the reviewed geographic area and reviewed business category, as indicated by block 88. In some cases, the numerical rating provided by the experts is averaged, and the ranking for a local search result is based on its distance to the query location, its relevance, and the weighted average rating of the experts. Next in this embodiment, the process 76 sends the ranked search results to the user, as indicated by block 90. For example, those search results above a threshold rank, e.g., the top ten results, can be sent for presentation in an interface in a web browser on the user device.

In some embodiments, the process 76 includes receiving a selection of one of the search results by the user, as indicated in block 92. The user interface at the client device detects the selection and requests reviews relating to the selected search result, for instance, reviews about a selected business. In response, reviews by the experts of the business/area pair corresponding to the search results are retrieved, and the reviews are ranked according to the expertise score of the respective expert, as indicated by block 94. The ranked reviews are sent for presentation on the user device, as indicated by block 96. In some cases, those reviews ranked above a threshold, for instance, the top ten, are sent for presentation in ranked order.

Figure 4:
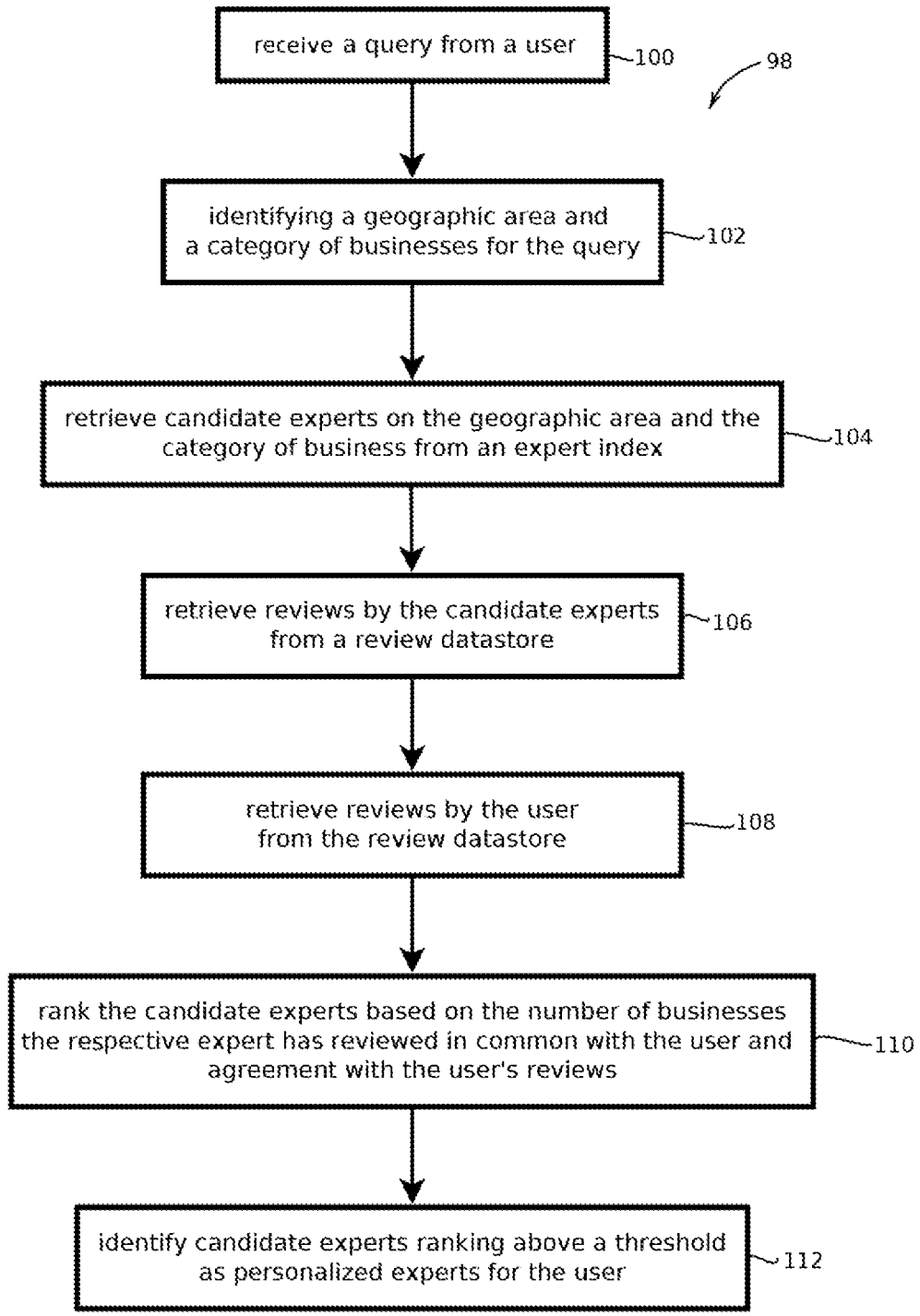
FIG. 4 shows an embodiment of a process for identifying personalized experts.

FIG. 4 illustrates an embodiment of a process 98 for identifying personalized experts. The process 98 is performed, in some embodiments, by the personalized-experts selector module 64 of FIG. 1, but is not limited to that implementation. The process 98 of this embodiment includes receiving a query from a user, as indicated by block 100. The query may be a local search query specifying a query location, a business type, and an identifier of the user from whom the query was received. Next, this embodiment includes identifying a geographic area and a category of business for the query, as indicated by block 102, and retrieving candidate experts on the geographic area and the category of business from an expert index, as indicated by block 104. As discussed above, in some embodiments, a query location and responsive search results are obtained for the search query. A business category, if any, is then determined for each responsive search result, and candidate experts are retrieved for the query location and business category of each search result. Reviews by the candidate experts are then retrieved from a review data store, as indicated by block 106, and reviews by the user who submitted the query are also received from the review data store, as indicated by block 108. Next, the candidate experts are ranked based on 1) the number of businesses that have been reviewed by both the respective expert and the user (i.e., the number of shared review topics) and 2) agreement between the respective expert's reviews and the user's reviews, as indicated by block 110. For example, if the ninth ranked expert, according to non-personalized expertise scores, has reviewed more businesses in common with the user than any of the other experts, and the rating given by that ninth rank expert and the user matches in each instance, that ninth ranked expert may be re-ranked (or re-scored) as the top personalized expert for that user. Finally, the candidate experts ranking above a threshold, such as the top five, are identified as personalized experts for the user. The process 98 is performed at query time (i.e., after receiving the query and before providing search results) in order to reduce the memory consumption associated with identifying experts on every combination of business type, geographic area, and user, in advance. Or in some cases, the personalized experts may also be preprocessed to facilitate relatively prompt identification of such experts, e.g., by pre-processing experts on topics on which the user searches with greater than a threshold frequency. The personalized experts are then used to rank the local search results and select and rank reviews for presentation to the user, thereby providing the user with relatively relevant search results and reviews.

Figure 5:
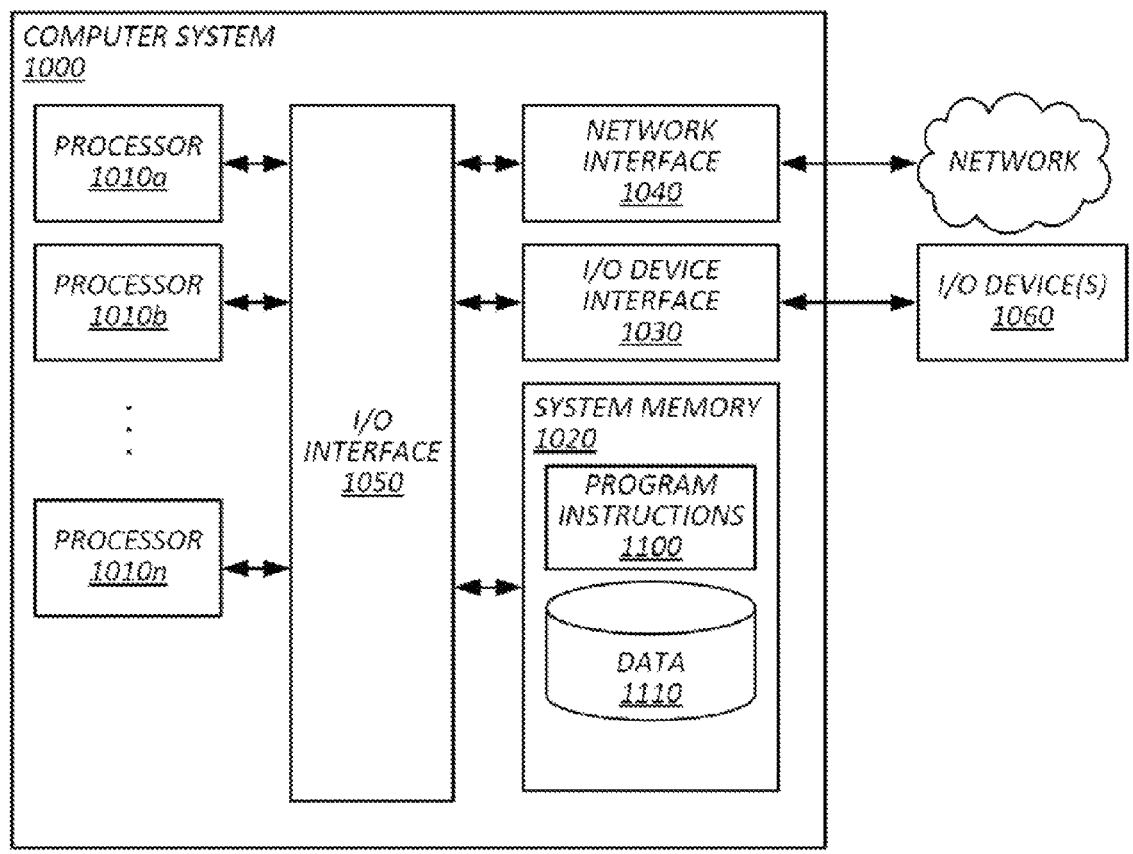
FIG. 5 shows an example of a computer system by which the above-mentioned processes and systems are implemented.

FIG. 5 is a diagram that illustrates an exemplary computing system 1000 in accordance with embodiments of the present technique. Various portions of systems and methods described herein may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes," and the like, mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining," or the like, refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance, signals represented as physical electronic, optical, or magnetic quantities within memories, registers, or other information storage devices, transmission devices, or display devices of the special purpose computer or similar special purpose processing or computing device.

What is claimed is:

1. A method of ranking local search results based on reviews by experts, the method comprising:
   receiving a query from a user via a user device;
   identifying a geographic area and a category of business for the query;
   identifying, with one or more processors using reviews related to the geographic area and the category of business from a plurality of users, a plurality of experts within the plurality of users based at least on respective numbers of reviews each user submitted, including iteratively modifying the category of business to identify at least a threshold number of experts;
   ranking, with the one or more processors, local search results responsive to the query based on reviews of the local search results by the plurality of experts; and
   causing the ranked local search results to be displayed via the user device.

2. The method of claim 1,
   further comprising increasing the geographic area to a hierarchically higher geographic area to identify at least the threshold number of experts.

3. The method of claim 1, further comprising:
   identifying, by the one or more processors, an expert as a personalized expert for the user based on the expert's reviews of businesses and the user's reviews of businesses.

4. The method of claim 3, wherein identifying the expert as a personalized expert further comprises:
   identifying a number of businesses reviewed by both the user and the expert; and
   identifying the expert as the personalized expert in response to determining that an agreement score based on differences between reviews of businesses reviewed by the user and the expert is below a threshold.

5. The method of claim 1, further comprising:
   identifying reviews for the geographic area and business category that are likely to be spam; and
   removing those reviews determined to likely be spam from the list of reviews used to identify an expert.

6. The method of claim 5, wherein identifying reviews for the geographic area and business category that are likely to be spam comprises:
   obtaining, for at least some of the reviews, indications from users expressing whether a respective review is helpful; and
   identifying reviews for the geographic area and business category that are likely to be spam in response to determining that at least some reviews are spam based on the indications.

7. The method of claim 1, further comprising:
identifying reviews for the geographic area and business category that are shorter than a threshold length or that have less than a threshold quality score; and
removing those reviews determined to be shorter than the threshold length or to have less than the threshold quality score from a list of reviews used to identify an expert.

8. The method of claim 1, wherein identifying an expert for the category of businesses and the geographic area comprises:
ranking a plurality of reviewers who have provided reviews for the geographic area and the business category according to a number of reviews provided; and
identifying the expert as the reviewer who provided a greatest number of reviews.

9. The method of claim 1, further comprising calculating an expertise score for an expert based on a number of reviews of the expert and text-quality scores for each of the reviews of the expert.

10. The method of claim 1, wherein ranking local search results comprises:
determining, for a respective local search result, a rating from an expert; and
calculating a weighted rating of the respective local search result based on the rating and an expertise score of the expert.

11. The method of claim 1, comprising:
receiving a user selection of one of the ranked local search results;
ranking reviews of the selected local search result based on expertise scores; and
sending the ranked reviews to the user for presentation in ranked order.

12. The method of claim 1, wherein identifying the plurality of experts further comprises:
initializing the category of business to an initial category of business for the query;
determining that no experts are designated for the geographic area and category of business; and
iteratively decreasing specificity of the category of business until an expert is designated for the modified category of business and the geographic area.

13. The method of claim 1, wherein identifying an expert in the category of businesses and in the geographic area comprises:
retrieving the expert from a previously formed index of experts, the index being keyed to the geographical area and the business category, and created from a classification of a plurality of reviews of a plurality of businesses in a plurality of geographic locations.

14. The method of claim 1, comprising:
selecting an advertisement based on the query; and
sending instructions to display the advertisement.

15. A tangible, non-transitory, machine-readable medium storing instructions that when executed by a data processing apparatus cause the data processing apparatus to perform operations comprising:
receiving a query from a user via a user device;
identifying a geographic area and a category of business for the query;
identifying, with one or more processors using reviews related to the geographic area and the category of business from a plurality of users, a plurality of experts within the plurality of users based at least on respective numbers of reviews each user submitted, including iteratively modifying the category of business to identify at least a threshold number of experts;
ranking, with the one or more processors, local search results responsive to the query based on reviews of the local search results by the plurality of experts; and
causing the ranked local search results to be displayed via the user device.

16. A system, comprising:
one or more processors; and
memory storing instructions that when executed by the one or more processors cause the one or more processors to effectuate operations comprising:
receiving a query from a user via a user device;
identifying a geographic area and a category of businesses for the query;
identifying, using reviews related to the geographic area and the category of business from a plurality of users, a plurality of experts within the plurality of users based at least on respective numbers of reviews each user submitted, including iteratively modifying the category of business to identify at least a threshold number of experts;
ranking local search results responsive to the query based on the expert's respective reviews of the local search results by the plurality of experts; and
causing the ranked local search results to be displayed via the user device.

17. The system of claim 16, the operations further comprising:
increasing the geographic area or to a hierarchically higher geographic area to identify at least the threshold number of experts.

18. The system of claim 16, the operations further comprising: identifying an expert as a personalized expert for the user based on the expert's reviews of businesses and the user's reviews of businesses.

19. The system of claim 18, wherein identifying the expert as a personalized expert further comprises:
identifying a number of businesses reviewed by both the user and the expert; and
identifying the expert as the personalized expert in response to determining that an agreement score based on differences between reviews of the same businesses by the user and the expert is below a threshold.

* * * * *